United States Patent

[11] 3,578,904

[72] Inventors Raymond D. Dewey
Bon Air;
Robert S. Mapes; Garth S. Jones,
Richmond, Va.
[21] Appl. No. 767,614
[22] Filed Oct. 15, 1968
[45] Patented May 18, 1971
[73] Assignee Reynolds Metals Company
Richmond, Va.

[54] FEATURE COUNTER WITH FEATURE DISCRIMINATION AND/OR MASKING
23 Claims, 9 Drawing Figs.

[52] U.S. Cl. .................................................. 178/6,
178/6.8, 356/102
[51] Int. Cl. .................................................. G01n 15/02,
G01n 21/22, H04n 7/00
[50] Field of Search ................................................ 178/6
(IND), 6.8; 356/102

[56] References Cited
UNITED STATES PATENTS
2,674,915  4/1954  Anderson ................. 178/6IND
2,803,406  8/1957  Nuttall ..................... 178/6IND
3,321,575  5/1967  Lewczyk ................. 178/6IND
3,389,789  6/1968  Watson ................... 178/6IND Primary Examiner—Bernard Konick
Assistant Examiner—Howard W. Britton
Attorney—Glenn, Palmer, Lyne, Gibbs and Thompson ABSTRACT: In the disclosed system a specimen is scanned by a video camera and the resulting video signals are applied to a digital logic circuit. The logic circuit is manually settable so that it produces signals only when the video camera scans features of the specimen that are greater than a preselected width and darker (or lighter) than a preselected grey level. The logic system includes a delay line and an anticoincidence detector for comparing the signals developed during two consecutive line scans so that only a single count pulse is produced for each feature. A scaler is provided for counting the features scanned. Either the features counted or the count pulses may be displayed on a video monitor or the count pulses and features may be displayed simultaneously. A variable electronic mask is provided so that an operator may select any portion of a specimen for analysis.

INVENTORS
Raymond D. Dewey
Robert S. Mapes &
Garth S. Jones

ATTORNEYS

INVENTORS
Raymond D. Dewey
Robert S. Mapes &
Garth S. Jones

BY Glenn, Palmer, Lyne,
Gibbs & Thompson
ATTORNEYS 3,578,904

FEATURE COUNTER WITH FEATURE DISCRIMINATION AND/OR MASKING

Many particle counters of the prior art employ flying spot scanners to scan the specimen to be analyzed. Some of these devices operate in accordance with light transmitted through the specimen and thus cannot be used to analyze surface features of an opaque specimen. Others operate in accordance with light reflected from the specimen but these devices have heretofore lacked the desired degree of resolution and accuracy.

Some of the particle counters of the prior art employ video cameras for scanning the specimen being analyzed thus permitting the analysis of the features of an opaque specimen. However, these devices suffer one or more disadvantages. Some are not capable of distinguishing the size of features; others are not capable of distinguishing between features of different colors or different shades of grey; others are inaccurate in that unusual shapes such as O or Y may be counted as more than one feature; still others are inaccurate in that they are incapable of distinguishing between closely spaced features and thus may count several closely spaced features as a single feature. While some prior art devices are capable of counting O- or Y-shaped features as a single feature, this ability is obtained by sacrificing the ability to distinguish between closely spaced features.

In specimen analysis it is desirable to be able to view the specimen being analyzed and to provide some indication on the display as to which features are being counted. Some prior art devices provide means for superimposing a check spot at the trailing edge of a counted feature on a visual display to thereby visually indicate the features being counted. However, these devices cannot accurately count O-shaped features and are not readily adapted for use with devices that can count such features.

A further disadvantage of the prior art has been the lack of a readily adjustable mask for selecting any desired area of the specimen for examination. Both the mechanical and electronic masks heretofore used in particle counters have required elaborate compensating circuits to prevent erroneous counts when the scanner passes from the unmasked to the masked area of the specimen.

Accordingly, an object of this invention is to provide a specimen analyzer which is capable of performing the functions of various prior art devices without the disadvantages of such devices.

It is an object of this invention to provide an accurate specimen analyzer which is capable of counting each O- and Y-shaped feature as a single feature.

Another object of this invention is to provide a specimen analyzer which counts features greater than a preselected width and darker (or lighter) than a preselected grey level.

A further object of this invention is to provide a specimen analyzer capable of accurately counting O- and Y-shaped features according to size or grey level, and including means for visually displaying reproduction of the specimen being analyzed, and means for superimposing upon the display a check spot adjacent each feature counted.

A still further object of this invention is to provide a specimen analyzer including a video camera for scanning a specimen, digital logic circuit means for distinguishing scanned features in the specimen on the basis of size or grey level, a masking means, and means for counting the distinguished features only if they are located in an unmasked area. The mask operates only on digital logic signals rather than the video camera signals and thus requires no special compensating circuits for overcoming edge effects.

Another object of the invention is to provide a specimen analyzer including means for distinguishing features on the basis of grey level or width, or both grey level and width, and means for displaying an indication of the features thus distinguished.

It is also an object of this invention to provide a specimen analyzer for counting features according to size and employing a retriggerable one-shot multivibrator as a pulse width discriminator whereby two features will be separately counted even if they are closely spaced.

It is also an object of this invention to provide means for determining the area of features on the basis of grey level, or width and within an unmasked area, said means employing an oscillator circuit which is turned on and off by digital signals representing the features, the area of the features becoming directly proportioned to the number of oscillator pulses.

These and other objects of the invention are accomplished by the provision of a video camera, a scaler, a video monitor, an electronic mask, an oscillator, and a digital logic circuit including a grey level discriminator, a pulse width discriminator, a delay line and a coincidence circuit. As the video camera scans across the specimen under analysis it provides an output voltage which varies in accordance with the grey level of the scanned portion of the specimen. This signal is fed to the grey level discriminator which produces a binary type output signal. This signal lasts as long as the camera scans a feature which is darker than the selected grey level. The output of the grey level discriminator is applied to the pulse width discriminator which produces an output signal only if the output from the grey level discriminator exceeds a preselected minimum width.

Sync signals from the video camera are applied to four one-shot multivibrators which comprise a manually adjustable electronic mask. The outputs from the one-shot multivibrators are logically combined and then used to control the output from the pulse width discriminator so that pulses from the discriminator are blocked if they were developed as a result of scanning a feature outside of the unmasked area.

The pulses from the discriminator that are not masked out are applied to a coincidence circuit and a delay line having a delay equal to one line scan interval of the video camera. The coincidence circuit compares the output from the pulse width discriminator with the output of the delay line and produces an output signal one line scan interval after the video camera last scans the dark features. This output signal is applied to a scaler to provide a count of the number of features darker than the selected grey level and wider than the selected width. It may also be applied to the video monitor or display.

Switch means are provided for selectively applying to the scaler or video monitor the output signals from the video camera, the grey level discriminator, and the pulse width discriminator.

The output of the oscillator is gated by the output of the pulse width discriminator to provide an input to the scaler indicative of the area of features darker than the preselected grey level and wider than the preselected width.

The invention and its mode of operation will be better understood upon consideration of the following description and the accompanying drawing in which.

In the following description of the operation and construction of the invention reference will be made to signals as being positive or negative. It should be understood that this reference is only for the purpose of simplifying the description. In a preferred embodiment the basic logic block is a transistorized NAND gate which produces a logical 1 5.4 output signals if any input is at a logical 0 level 0. If all inputs are either open or at the logical 1 (high) level then the output is at the logical 0 (low) level. The term positive refers to the logical 1 level and the term negative refers to the logical 0 level. The terms as used in describing logical operations are used in the sense that they are relative to each other.

Figure 1:
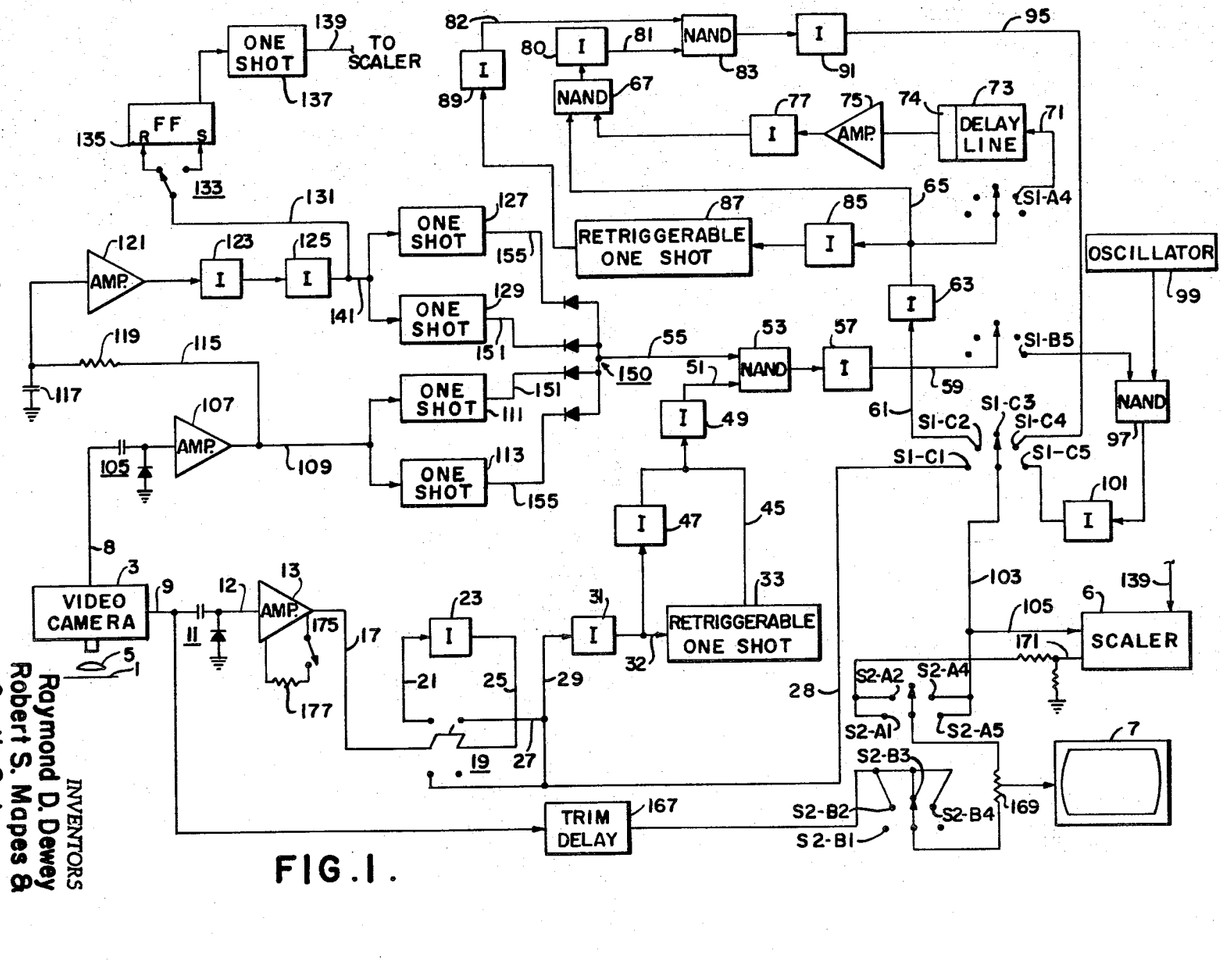
FIG. 1 is a schematic block diagram of a specimen analyzer in accordance with the invention.

Referring now to FIG. 1, the specimen 1 is scanned by a video camera 3 through a microscope or other lens system 5. This specimen may be a metallic object, a blood sample, a sample of pollutants taken from the air or any other specimen having features or particles which it is desired to count. The video signals produced by the video camera may be continuously displayed on a conventional television monitor 7. The system of FIG. 1 also continuously analyzes the video output of the camera and produces marker pulses that may be displayed on the monitor. The marker pulses may either be displayed alone or superimposed upon the direct video output of the camera. The marker pulses may be accumulated by a scaler 8 but the scaler will accept and count marker pulses only when a counting cycle is initiated by a pushbutton control. As subsequently described, a counting cycle may comprise the time for the camera to completely scan the specimen and thus may be approximately equal to the time required for the camera to scan one field.

Figure 5:
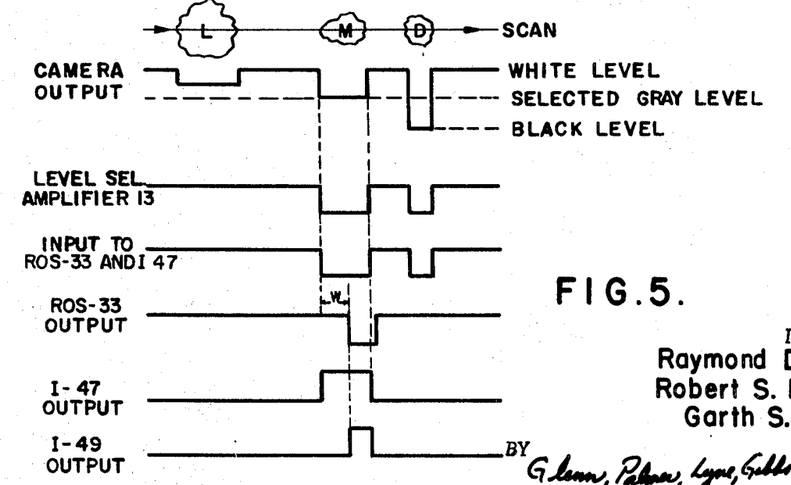
FIG. 5 is a waveform diagram showing various waveforms occuring within the circuit of FIG. 1; and, FIGS. 6A—6D are further waveform diagrams illustrating the operation of the invention.

The video camera 3 may be a conventional television camera such as is commonly used in closed circuit television systems and preferably has a resolution of 800 lines per frame. The camera is adapted to produce vertical and horizontal sync pulses on an output lead 8, and a video signal on an output line 9 which varies in accordance with the color or grey level of the portion of the specimen being scanned at any particular instant. This is illustrated in FIG. 5 where the camera output signal is illustrated from one horizontal line scan interval wherein the camera scans the cross a large light grey feature L, a medium-sized feature M of an intermediate shade of grey, and a small feature D of a dark shade of grey. For purposes of this illustration it is assumed that the specimen has a white background. As is evident from FIG. 5, the video signal produced by the camera has a maximum value when the camera is scanning black features.

Figure 2:
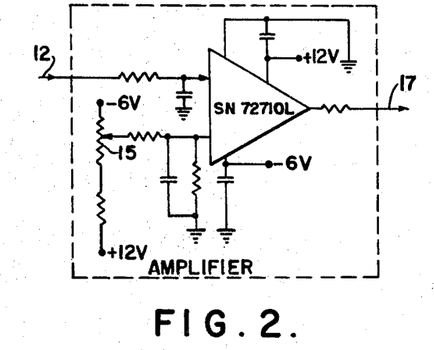
FIG. 2 is a schematic circuit diagram of the amplifier shown in FIG. 1.

The video signal produced by the camera is applied through a diode capacitor clamp 11 to an input of an amplifier 13. As shown in FIG. 2, this amplifier includes as the basic element a Texas Instrument type SN72710L differential comparator. One input of the comparator is connected through a potentiometer 15 to a source of voltage. The video signals from the camera is applied to the second input of the differential comparator. The comparator compares the two voltages applied to its inputs and produces a binary-type output signal. This output signal has a first value of approximately 3.5 volts when the video signal exceeds the bias voltage applied to the comparator through potentiometer 15, and has a second value of approximately 0 volts when the video signal is less than the voltage derived through potentiometer 15. The duration of each binary signal corresponds to the width of the feature which caused it to be produced.

In some instances it is desirable to count or display only those features of the specimen which are darker than some selected shade of grey. The amplifier 13 accomplishes this purpose. The potentiometer 15 is manually adjustable from the control panel of the specimen analyzer. Thus, an operator may adjust the potentiometer and select the voltage applied to the first input of the differential comparator. FIG. 5 illustrates the condition where potentiometer 15 has been set to a selected grey level which is darker than the light grey feature L but lighter than the medium grey or dark grey features M and D. The level select amplifier 13 ignores the light grey feature L and its output remains at a high level until the scan of the camera encounters the leading edge of the medium grey particle M. At this time the output of the level select amplifier drops to a low value and remains at this value until the trailing edge of the feature is encountered. The output of the level select amplifier then returns to a high level and remains until the leading edge of the dark feature D is encountered. During the time the feature D is being scanned the output of the level select amplifier 15 remains at a low level and returns to a high level when the scan of the camera reaches the trailing edge of the feature. It is evident from a comparison of the waveforms for the camera and amplifier 13 that the amplifier has discriminated between features on the basis of grey level and produced output signals only for those features darker than the selected grey level.

The output of amplifier 13 is connected by way of a lead 17 to a terminal of a double-pole double-throw switch 19. For purposes of the present description it will be assumed that the switch 19 is in its upper position so that the lead 17 is connected through the switch and a lead 21 to an inverter 23. Inverter 23 serves the purpose of adjusting the voltage levels at the output of amplifier 13 to the optimum levels for operating the logic circuit to which these signals are subsequently applied. As stated before, the binary output signals from amplifier 13 are either at +3.5. or O. The inverter 23 raises the +3.5 volt signals to the logical one level of 5.4 volts but in doing so causes a signal inversion. Therefore, the output of inverter 23 is connected by way of a lead 25, switch 19, lead 27, and lead 29 to the input of an inverter 31. The inverter 31 again inverts the signals to bring them back in phase with the output signals from amplifier 13.

Figure 4:
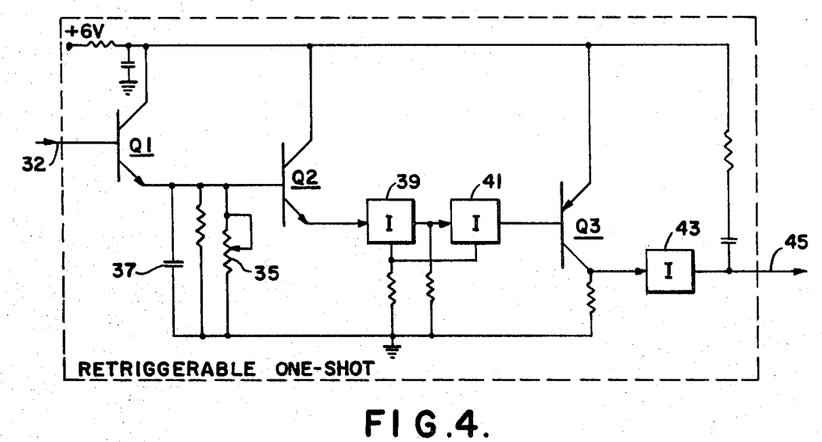
FIG. 4 is a schematic wiring diagram of a retriggerable one-shot multivibrator.

The output of inverter 31 is connected to the input of a retriggerable one-shot multivibrator 33. The retriggerable one-shot is a commercially available integrated circuit of conventional design and for purposes of the present description the circuit is shown in FIG. 4. The retriggerable one-shot functions as a conventional one-shot is that it receives an input signal and then, after a predetermined delay, produces an output signal. However, the retriggerable one-shot differs from the conventional one-shot in that the delay period of the retriggerable one-shot immediately restarted each time the one-shot receives a new input signal. This feature is used for the purpose of discriminating between features on the basis of the width of the features. Generally speaking, for input signals of a duration less than the delay interval of the retriggerable one-shot, the one-shot produces no output signals. For input signals of a duration greater than the delay interval of the one-shot the output signal is the residue obtained by blanking out a leading edge portion of the input signal equal to the delay interval.

The operation of retriggerable one-shot multivibrator 33 as a feature width discriminator may be best understood by considering FIG. 4 in connection with the waveform diagrams of FIG. 5. As previously explained, the grey level select amplifier 13 ignores the large light feater L and produces low level output signals only during the time that the camera is scanning across the feature M and D. The output of amplifier 13 is twice inverted by inverters 23 and 31 so that the input to the retriggerable one-shot 33 has the same waveform as the output of amplifier 13. The retriggerable one-shot includes a potentiometer 35 which is manually controllable from the control panel of the specimen analyzer. As will be evident from the following discussion this potentiometer may be selectively set to discriminate between features on the basis of the widths of the features. Assume that the potentiometer 35 is set to detect features having a width greater than W where W is less than the width of the particle M but greater than the particle D. Up until the time the video camera encounters the leading edge of the feature M the input to the retriggerable one-shot is at a high level thus causing transistor Q1 to conduct. Current from a 6-volt source flows through Q1 to charge a capacitor 37 and apply a positive signal to a transistor Q2. Transistor Q2 conducts and produces a high level signal at its emitter. This signal is inverted by inverters 39 and 41 and applied to the base of a transistor Q3, thus holding Q3 in the off condition. The low level signal at the emitter of Q3 is inverted by an inverted 43 to produce a high level output signal from the retriggerable one-shot.

When the scan of the video camera intercepts the leading edge of the particle M the input signal to the retriggerable one-shot drops from a high level to a low level. This cuts off transistor Q1. However, because of the charge on capacitor 37 there is no immediate change in the output from the retriggerable oneshot and the output remains at a high level. When Q1 is cut off the capacitor 37 begins to discharge and the rate of discharge is governed by the setting of the width discriminator potentiometer 35. After an interval of time W as determined by the setting of potentiometer 35., the capacitor 37 discharges to a value sufficiently low to cut off transistor Q2. This causes the output of the retriggerable one-shot to drop to a low level.

The output from the retriggerable one-shot remains at a low level until the scan of the camera reaches the trailing edge of the feature M. At this time the input signal to the retriggerable one-shot again rises to the high level and transistor Q1 is again turned on. The capacitor 37 is immediately recharged and the transistor Q2 turned on, thus causing the output of the retriggerable one-shot to return to the high level. As shown by the waveform of FIG. 5, the net effect of the retriggerable one-shot is to delay the input signal applied thereto for an interval W and shorten the leading edge of the input signal by an interval W.

In FIG. 5 it was assumed that the feature D had a width less than W. The low level signal representing feature D is applied to the retriggerable one-shot and the delay interval is initiated. However, because the feature has a width less than the preselected delay interval as determined by potentiometer 35, the input signal to the retriggerable one-shot returns to a high level before the delay interval is terminated and thus prevents a low level output signal from being produced.

As the potentiometer 35 is adjusted to produce a minimum resistance in the discharge path for capacitor 37 the delay interval W becomes less and the retriggerable one-shot will produce output signals representing smaller features.

There is a slight delay in the resetting of the retriggerable one-shot that is caused by transit time of a signal through the one-shot. To overcome or correct for this, an inverter 47 is connected between the input and output of the retriggerable one-shot. As soon as the trailing edge of a dark feature is reached the input of inverter 47 goes positive thus driving its output negative. The outputs of retriggerable one-shot 33 and inverter 47 are tied together and to the input of an inverter 49. When the output of inverter 47 goes negative it drives the output of inverter 49 positive even though the output of the one-shot may still be positive.

It should be noted that the last waveform of FIG. 5 represents the result of discriminating between the features L. M and D on the basis of both grey level and width. The retriggerable one-shot produces an output signal for the feature M because only this feature is darker than the selected grey level and wider than the selected width. Had the feature L been darker than the preselected grey level then the waveform for the retriggerable one-shot would include a low level representing feature L, this signal being longer than the signal representing the feature M.

The fast response of the retriggerable one-shot enables the present device to accurately recognize two particles that are extremely close together. If the video camera is capable of recognizing a separation between features then this recognition will not be lost by the pulse width discriminator. Thus, two closely spaced features will be counted as separate features and not as a single feature as happens with some prior art devices. It is evident from the preceding discussion that the retriggerable one-shot 33 has an extremely fast response time. By varying the potentiometer 35 delay times as great as 10 microseconds may be obtained while still retaining a one-fourth microsecond resolution. For such operation it is obvious that the capacitor 37 must be quite small. In fact, in some instances the capacitor 37 may be nothing more than the inherent capacitance of the circuit.

The output of inverter 49 is connected by way of a lead 51 to a first input of NAND gate 53. The second input of NAND gate 53 is connected by a way of lead 55 to the output of the mask control circuit. These circuits are subsequently described. For the present discussion it is sufficient to state that the lead 55 is at a high level any time the video camera is scanning an unmasked area. NAND gate 53 produces a low level or logical 0 signal at its output when both input leads 51 and 55 is at the high or logical 1 level. If either lead 51 or 55 is at the logical 0 level then the output from NAND gate 53 is a logical 1. Thus, even though there is a pulse produced on lead 51 for every scanning intercept of a feature within the field of view of the video camera that meets both the grey level and the width test, only those pulses corresponding to intercepts of features within the unmasked area are passed through the NAND gate These pulses are then inverted by an inverter 57 and appear as logical 1 intercept signals at the output of the inverter.

The output of inverter 57 is connected by way of a lead 59 to the common terminal of level B of a three-level-five position gang switch S1. The output of inverter 57 is also connected by way of the lead 61 to the terminal C2 of the switch S1.

The switch S1 has four operative positions. Position three is an inoperative position and corresponds to the Off position. When the switch is set to position two, the intercept output signals from inverter 57 are applied through S1–C2 to a lead 103. This lead connects with lead 105 which is the count pulse input to the scaler 6. As subsequently described, the scaler requires an enabling input signal on lead 139 and this signal occurs for the duration of one camera field following the closing of a switch 133. This operation is described in greater detail below. However, it may be noted at this point that the scaler, if conditioned to count, will respond to output signals from inverter 57 and provide an indication of the number of times during one field that the camera scan intercepts a particle in the unmasked area that is both darker than the preselected grey level and wider than the preselected width.

The intercept pulses applied to the counter may also be discontinuously displayed on the monitor 7 by setting the switch S2 to position 5. A circuit is then formed from inverter 57, switch contact S1–C2, lead 103, switch contact S2–A5 and potentiometer 169 to the display monitor.

The output of inverter 57 is also applied to an inverter 63 and the output of this inverter is connected by way of a lead 65 to one input of NAND gate 67. The output of inverter 63 is also connected by way of a lead 69 to the common terminal of the A level of switch S1. Contact A4 of switch S1 is connected by way of a lead 71 to a microsecond delay line 73. This delay line may, for example, be a glass ultrasonic delay line such as the model CE–5.04 manufactured by the Corning Glass Works. The delay line provides a nominal delay of one line scan interval and includes a variable adjustment 74 which permits varying the delay for an interval greater than one line scan interval. The output of the delay line is connected through a noninverting amplifier 75 to an inverter 77. The output of inverter 77 is connected to a second input of NAND gate 67. Amplifier 75 may be similar to the circuit shown in FIG. 2.

The output of NAND gate 67 is connected through an amplifier and a lead 81 to one input of a NAND gate 83. The output of inverter 63 is connected through an inverter 85 to the input of a retriggerable one-shot 87 and the output from the retriggerable one-shot is connected through an inverter 89 to a second input of the NAND gate 83. The output of NAND gate 83 is connected through an inverter 91 to the terminal C4 of the switch S1. When the switch S1 is set to position 4 it connects the output of inverter 91 with the input of the scaler 6.

One of the primary functions of the specimen analyzer is to count the number of features which meet a preselected grey level test and are wider than a preselected width. In order to accomplish this purpose the scaler should receive only one pulse for each feature meeting the test regardless of the number of times the video camera scans across the feature. The video camera scans the specimen in a sequence of horizontal scans each slightly vertically displaced from the previous scan as is conventional in television practice. The single feature may be intercepted several times, the exact number of times being dependent upon the length of the feature in the direction transverse to the scanning operation. Each intercept of the feature results in an output from NAND gate 53 when the feature is within the unmasked area and meets both the grey level and width tests. One purpose of the circuits connected to the output of inverter 63 is to compare the output of NAND gate 53 during each horizontal scan with the delayed output of the NAND gate for the preceding scan and produce an output signal only when there is a delayed signal indicating an intercept but no real time signal indicating an intercept. Stated differently, the circuit is responsive to the output of inverter 63 to produce a single output pulse for each feature to be counted, and this pulse occurs on the line scan interval after the last intercept of the feature.

A mere delay line and comparison circuit would be sufficient for resolving the feature count if all particles had straight edges. In this case, each intercept of the feature would occur exactly one line scan interval after the preceding intercept. However, it is most unusual to find features having straight edges. More generally, they are quite irregular in shaped or at least have curved edges so that the scan of the video camera during one line scan does not intercept the feature exactly one line scan interval later during the next scan. Another purpose of the circuits connected to the output of inverter 63 is to overcome this problem and thus permit a single count pulse to be developed for each feature even though it might be quite irregular.

FIG. 6A through 6D illustrate the four situations that may arise in resolving the intercept pulses produced at the output of NAND gate 53 so as to produce a single count pulse for each feature rather than for each intercept of the feature. To simplify the following discussion, it is assumed that the changes in signal level at gate 53 and inverter 63 occur exactly at the interval the camera scan intercepts the feature. This would correspond for the condition where the control of the retriggerable one-shot 33 is set to detect any feature greater than 0 width. In cases where features greater than the width W are being detected, the waveform 63 is shortened and delayed at its leading edge.

Figure 6A:
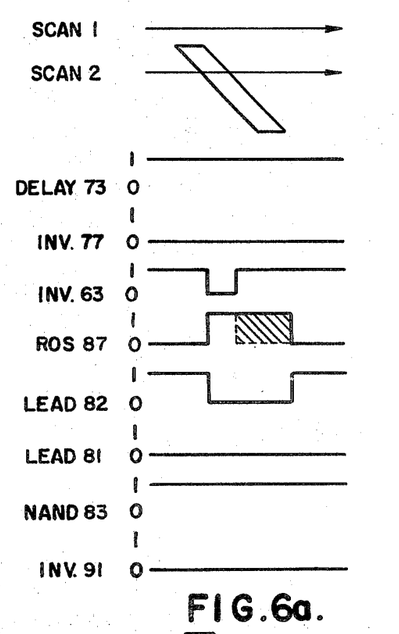

FIG. 6A illustrates the situation where, during a present scan 2 a feature is intercepted, but on a preceding scan 1 the feature was not intercepted. Under these circumstances the high level signal entered into delay line 73 from the output of NAND gate 53 during scan 1 emerges during scan 2. The emerging signal is inverter by inverter 77 and applied to NAND gate 67. Therefore, during scan 2 the low level output of inverter 77 passes through NAND gate 67 and inverter 80 and appears as a logical 0 on lead 81. The logical 0 signal appears at the output of NAND gate 83 as a logical 1 and this is inverted by inverter 91 to produce a logical 0 signal on the lead 95. The logical 0 level on the lead 95 will not provide a count pulse for the scaler 6.

Figure 6B:
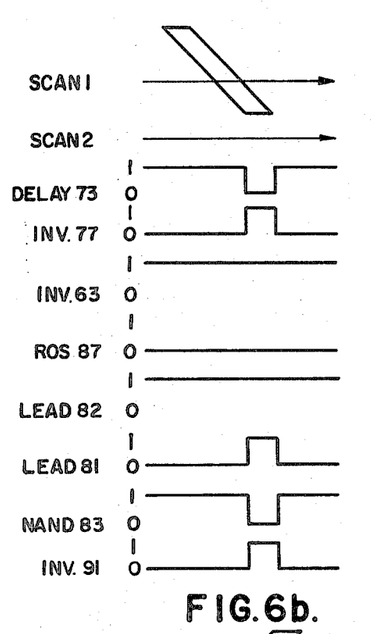

FIG. 6B illustrates a set of conditions where a present scan 2 does not intercept a feature but the preceding scan 1 does intercept the feature. In this case a logical 1 level should be produced on the lead 95 to be applied as a count pulse to the scaler. During the interval of scan 1 that the feature is being intercepted the negative output signal from NAND gate 63 is stored in delayed line 73. During scan 2 the delay signal emerges from delay line 73 and is inverted at inverter 77 to produce a logical 1 at one input of inverter 77. As shown in FIG. 6B, the output of inverter 77 is shifted to the right with respect to the cross section of the feature intercepted during scan 1. This shift indicates a delay of more than one line scan interval and is set by the manually adjustable delay trimmer 74. The output of inverter 77 is applied to one input of NAND gate 67. Since the feature is not intercepted during scan 2 the output of NAND gate 53 is at the logical 1 level. This logical 1 signal is inverted at inverter 57 and inverted again at inverter 63 and applied as a logical 1 level to the second input of NAND gate 67. With both inputs positive NAND gate 67 produces a logical 0 output that is inverted by inverter 80 and applied over lead 81 as a logical 1 signals to the NAND gate 83.

The logical 1 signal appearing at the output of inverter 63 is inverted at 85 and applied as a logical 0 signal to the input of retriggerable one-shot 87. The retriggerable one-shot does not invert the signal so the logical 0 output from the retriggerable one-shot is inverted by inverter 89 and applied as a logical 1 signal over the lead 82 to the NAND gate 83. Therefore, both inputs to NAND gate 83 are at the logical 1 level as long as there is a logical 1 output from inverter 77. The resulting logical 0 signal appearing at the output of NAND gate 83 is inverted by inverter 91 to become a logical 1 count pulse on the lead 95.

Figure 6C:
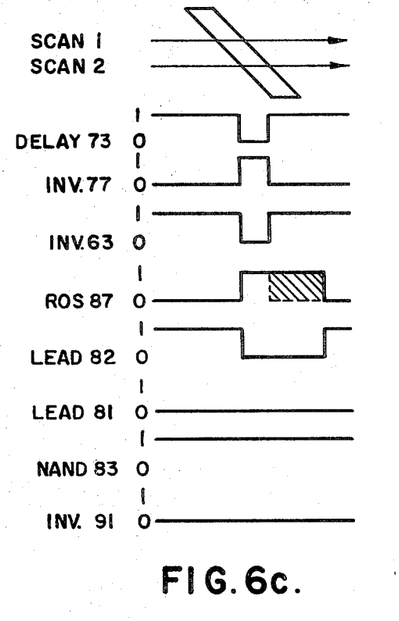
Figure 6D:
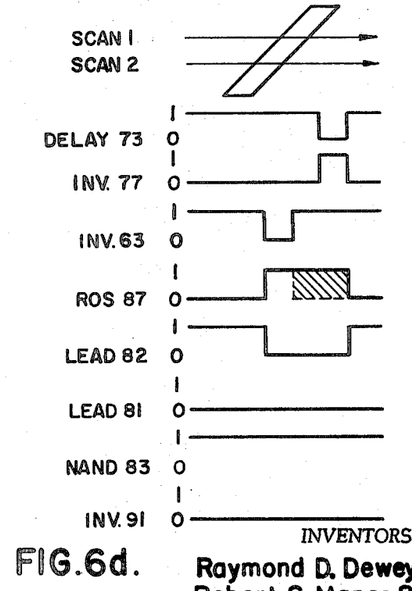

FIGS. 6C and 6D illustrate the situations that may occur when two successive scans intercept a feature but the intercepts do not occur exactly one scan interval apart. FIG. 6C illustrates the case where the feature is intercepted earlier during scan 1 than it is during scan 2. The logical 0 output signal from NAND gate 53 produced during scan 1 is stored in the delay line 73 and emerges slightly more than one line scan interval later. The logical 0 signal is inverted by inverter 77 and applied to one input of NAND gate 67. The logical 0 output signal occurring at the output of NAND gate 53 during scan 2 is inverted at inverters 57 and 63 and applied to the second input of NAND gate 67. As shown by FIG. 6C the output of inverter 77 would rise to the logical 1 level before the output of inverter 63 dropped to the logical 0 level if the delay line did not delay the signal applied to it by more than one full line scan interval. However, with the delay introduced by the adjustable section 74, the output of the inverter 77 remains at the logical 0 level at least until the output of the inverter 63 drops to the logical 0 level. At the end of the logical 0 signal, the output of inverter 63 rises to the logical 1 level but at this time, the output of the inverter 77 is shifting to the logical 0 level so NAND gate 67 remains blocked. The high level output from the NAND gate is inverted by inverter 80 and applied as a logical 0 signal over the lead 81 to NAND gate 83. This blocks NAND gate 83. However, NAND gate 83 could not produce a count pulse even if the pulse at inverter 63 terminated before the pulse at inverter 77. The logical 0 output from inverter 63 is inverted at 85, the trailing edge delayed at 87, and the resulting signal inverted at 89 to appear on lead 82. The trailing edge delay introduced by retriggerable one-shot 87 enables the lead 82 to remain at the logical 0 level until some time after a logical 1 level on lead 81 terminates. Therefore, NAND gate 83 would maintain a logical 1 output that would be inverted at 91 to appear as a logical 0 (no count) on the lead 95.

FIG. 6D illustrates the operation of the circuit where the feature is intercepted at a particular point during scan 1 and is intercepted at a second point in scan 2 which is less than one whole line scan interval later. A detailed explanation of the circuit operation is deemed unnecessary in view of the illustrations given below. In general, the trim delay 74 and delay line 73 delay the output of inverter 63 and the resulting signal is compared with the real time output from inverter 63. Any residue signal resulting from this comparison is applied to the NAND gate 83. However, this residue pulse, if any, is blocked at NAND gate 83 because the trailing edge of the output signal of inverter 63 is delayed by retriggerable one-shot 87 and applied to lead 82 to block the NAND gate.

Although FIGS. 6A through 6D illustrate the development of a single count pulse for a single solid feature, the invention is not so limited. By waveforms similar to those of FIGS. 6A through 6D it can be shown that the present invention produces a single count pulse for features having lighter grey interior portions such as, for example, O-shaped features. The only time that the present invention will produce an inaccurate count is when it analyzes a feature having a reentrant outline with more than one downwardly extending appendage. In this case a count pulse is developed for each of the appendages. For example, an inverted Y feature would be counted as two features.

The feature count pulses appearing on lead 95 may be applied to scaler 6 and the video monitor 7. The circuit extends from lead 95 through S1–C4 and lead 103 to the input of the scaler. If the scaler is conditioned by a control signal on lead 139 it will accept the pulses. For display purposes the count pulses on lead 103 are applied to S2–A1 and S2–A2. If switch 2 is set to either position one or position two then the count pulses pass through mixing potentiometer 169 to the monitor. If switch 2 is set to position one then the count pulses are displayed alone on the monitor. If the switch is set to position 2 then the count pulses are displayed superimposed on an image of the specimen. The video image signal is derived from the lead 9 output of the camera and passes through trim delay 167 and S2–B2 to the mixing potentiometer where it is mixed with the count pulses. The combined signal is then fed to the input of the video monitor 7. The trim delay merely delays the video signal on lead 9 to compensate for the delays introduced by the logic circuits which produce the count pulses. This insures that the count pulses are near the features they represent, and are not offset therefrom on the video display. The feature analyzer may also be utilized to determine the percentage of the unmasked area of a specimen covered by the features. Briefly, the output of NAND gate 53 is utilized to control pulses generated by an oscillator and these pulses are fed to the scaler 6. In order to accomplish this, the terminal B5 or switch S1 is connected to one input of a NAND gate 97. An oscillator 99 has its output connected to a second input of the NAND gate 97. The output of NAND gate 97 is connected through an inverter 101 to the terminal C5 of switch S1. The common terminal of switch S1 is connected by lead 103 and a lead 105 to the scaler.

In order to obtain an accurate count it is necessary to limit the counting operation to one field of the video camera scanning cycle. To accomplish this the negative horizontal and vertical sync pulses from the video camera are applied over lead 8 and a diode clamp 105 to an amplifier 107. The amplifier 107 is a noninverting amplifier which shapes the pulses and applies them over the lead 109 to the right and left mask control one-shots 111 and 113. Although both horizontal and vertical sync pulses appear on lead 109 only the horizontal pulses are effective to control the one-shots. The vertical sync pulses occur between fields of scan and thus their action upon the one-shots 111 and 113 is not important.

The horizontal and vertical sync pulses at the output of amplifier 107 are applied over a lead 115 to a resistance capacitance filter comprised of resistor 119 and capacitor 117. The filter filters out the horizontal sync pulses and applies only the vertical sync pulses to an amplifier 121. This amplifier is a noninverting amplifier and, like amplifier 107, may be of the type shown in FIG. 2. The output of amplifier 121 is applied to the inverter 123 which functions to adjust the amplifier output voltage to the logic levels used in the system. The output of inverter 123 is applied to an inverter 125 which brings the signal back into the proper phase. The output of inverter 125 is connected to the top and bottom mask control one-shots 127 and 129.

The output of inverter 125 is also connected by way of a lead 131 to the common terminal of a push button start switch 133. The start switch has a normally closed terminal connected to the reset input of a flip-flop 135 and a normally open contact to the set input of the Flip-flop. The output of the flip-flop is connected to a one-shot multivibrator 137 and the output from this one-shot is connected by way of a lead 139 to the reset circuits and the count control circuits in the scaler 6.

As long as the push button switch 133 is in the position shown in FIG. 1, vertical sync pulses are applied through the switch to the reset input of the flip-flop. However, these pulses have no effect on the flip-flop since it takes a negative pulse into the set input terminal to set the flip-flop once it has been reset. In order to initiate a feature count, the pushbutton 133 is operated thus closing the circuit into the set input terminal of the flip-flop. The first vertical sync pulse occurring after the pushbutton is closed, sets the flip-flop thus causing a positive output signal to the one-shot 137. The transition of the voltage at its input from the negative to the positive level triggers the one-shot and it produces an output signal on lead 139. The timing constants of the one-shot multivibrator circuit are chosen such that the one shot triggers immediately upon receiving a positive going input signal and returns to its normal state after an interval of time corresponding approximately to the time it takes the camera to scan one field. The scaler 6 may, for example, be a Hewlett-Packared model 5203L. The output of one-shot 137 controls both the resetting of the scaler and the gating of count pulses into the scaler, these count pulses being applied to the scaler over the lead 105.

The scaler counts for only one cycle regardless of the interval of the that the pushbutton 133 is depressed. The flip-flop is set by the first sync pulse and nothing can change the state of the flip-flop except the release of the push button so that a negative sync pulse may be applied to the reset input. Therefore, the flip-flop remains set as long as the pushbutton 133 is closed and the signal applied to the one-shot remains at a positive level during this interval. However, as subsequently explained in connection with FIG. 3, the one-shot 137 only responds to the transition of an input signal from a negative to a positive level. Once the one-shot has responded to this transition it takes a second transition to cause a second operation of the one-shot.

The mask control circuit comprises the four one-shot multivibrators 111, 113, 127, and 129. As previously mentioned, the one-shot 111 and 113 receive negative horizontal sync pulses over lead 109 and are used to control the right and left edges of the mask. The one-shots 127 and 129 receive vertical sync pulses from the inverter 125 and control the top and the bottom of the mask. The output of each of the one-shots is connected through a diode to the lead 55. The diodes function as a logical AND gate so that the lead 55 is positive only when all of the one-shots are producing a positive output signal. A negative signal on lead 55 masks out all detected features by preventing the pulses representing these feature from passing through the NAND gate 53.

Figure 3:
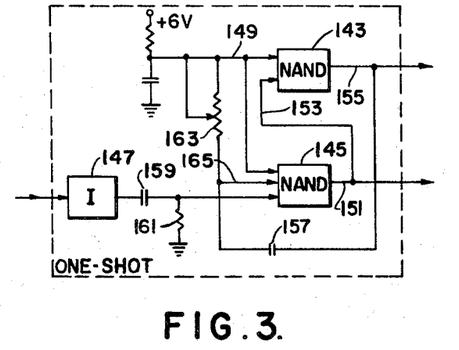
FIG. 3 is a schematic wiring diagram of a one-shot multivibrator.

FIG. 3 shows a one-shot multivibrator suitable for use in the mask control circuit. The one-shot comprises two logical NAND gates 143, and 145 and an inverter 147. A positive bias voltage is connected by way of a lead 149 to one input of both NAND GATES. NAND gate 145 has an output 151 connected by way of a lead 153 to a second input of NAND gate 143. NAND gate 143 has an output 155 connected through a timing capacitor 157 to a second input of NAND gate 145. The output of inverter 147 is applied through a differentiator comprised of a capacitor 159 and a resistor 161 to a third input of NAND gate 145. A potentiometer 163 is connected between lead 149 and the capacitor 157 to control the charging rate of the capacitor and thus the cycling time of the one-shot. The potentiometers 163 for each of the four one-shots in the mask circuit are mounted on the control panel of the specimen analyzer so that the operator may readily adjust the mask.

In the steady state condition of the one-shot multivibrator all inputs to NAND gate 145 are positive and it produces a negative output signal on the lead 151. This negative signal is applied to NAND gate 143 so that the multivibrator produces a positive output signal on lead 55. A positive going input pulse, such as that occurring at the end of a negative vertical or horizontal sync pulse, applied to the multivibrator is inverted by inverter 147 and the leading edge of the resulting negative signal is differentiated and applied to NAND gate 145. The NAND gate immediately produces a positive output signal on lead 151 and this is applied to NAND gate 143. Since the other input of NAND gate 143 is also positive, the output of the gate drops to the negative level. This discharges capacitor 157 so that the input 165 of NAND gate 145 drops to the negative level thus holding the output of this gate at the positive level.

After some predetermined interval of time, as determined by the setting of potentiometer 163, the capacitor 157 is recharged and the input 165 to NAND gate 145 rises to a positive level. With all inputs positive the NAND gate produces a negative output signal on lead 151. This signal is fed to NAND gate 155 so that the gate 155 produces a positive output signal. The multivibrator remains in this state until the next positive going signal is received at its input The one-shot 111 controls the position of the right edge of the mask because the output lead 151 of this one-shot is connected to the diode AND gate 150. One-shot 111 applies a positive pulse to the AND gate from a time immediately following the termination of a horizontal sync pulse until some time as determined by the setting of potentiometer 163 in the one-shot.

One-shot 113 is for the purpose of controlling the left edge of the mask. The output 155 of this one-shot is connected to the diode AND gate so the one-shot produces a negative output signal from a time immediately following a negative horizontal sync pulse until some period of time as determined by setting of its potentiometer 163. The output of the one-shot then becomes positive to condition one input of the AND gate.

One-shot 127 controls the bottom edge of the mask. The output 155 of this one-shot is connected to the AND gate so the one-shot applied a positive level signal to the AND gate from the time immediately following a negative vertical sync pulse until some interval of time as determined by the setting of the potentiometer 163. The output of the one-shot then goes negative to block the AND gate.

One-shot 129 is for the purpose of controlling the top edge of the mask so that output 151 of this one-shot is connected to the AND gate. This one-shot produces a negative output signal from a time immediately following the termination of a negative vertical sync pulse until some interval of time as determined by the setting of the potentiometer 163 in the one-shot. Then, one-shot 129 produces a positive output signal to the AND gate.

The four one-shots provide an easily adjustable mask circuit that enables the operator of the analyzer to select for analysis any desired area of the specimen. Both the size and location of the area being analyzed are easily adjustable by means of four control knobs which control the potentiometer 163 in the one-shots. Furthermore, the mask has the advantage in that it does not mask all video signals produced by the camera but instead masks only the pulses representing features meeting common the grey level and width tests but falling outside of the desired area of analysis. Since the mask does not mask all video signals produced by the camera it is possible for the operator to view on the monitor 7 the whole specimen as seen by the camera while at the same time superimposing upon the display check spots which indicate the features within the unmasked area and meeting both the grey level and width tests. For this purpose, the video output line 9 of the camera is connected through a trim delay 167 through the terminals B2, B3, and B4 of the switch S2. The common terminal of this switch is connected through a potentiometer 169 to the display monitor 7. Therefore, the specimen as viewed by the camera may be displayed on the monitor 7 if the switch 2 is either in position 2, position 3, or position 4.

When the switch S2 is set for position 3, only the output of the video camera as it appears on lead 9 is applied to the mixing potentiometer 169 so as to result in a display on the monitor 7. However, if the switch S2 is set to position 2, check spot pulses are mixed with the video signal at mixing potentiometer 169 so as to be displayed on the monitor 7. These check spot pulses are produced by the scaler 6 and occur only when the scaler responds to an input pulse on lead 105. The marker pulses appear on lead 171 and pass through switch 2 position A2 to the mixing potentiometer 169.

In case of a malfunction, the scaler may not count all of the pulses applied to it over the lead 105. In this case, the uncounted pulses will not produce check spot pulses on the lead 171. Therefore, the operator may make a visual check to see that all pulses that should be counted are actually counted by the scaler.

It is also possible to observe the check spot pulses on the monitor without having them superimposed on the video output of the camera 3. The switch S2 is set to position 1 so that the check spot pulses on lead 171 pass through contact A1 of switch S2 to the mixing potentiometer 169. Since the contact S2–B1 is not connected to any circuit, there is no input to the mixing potentiometer from the camera through the B level of switch S2.

The foregoing detailed description has all been on the assumption that the analyzer is capable of detecting features which are darker than some predetermined grey level. However the device is also capable of operating in a mode whereby it distinguished features that are lighter than some preselected grey level. The switch 10 may be set to its lower position as viewed in FIG. 1 to accomplish this purpose. When the switch is so set, it eliminates the inverter 23 from the circuit and applies the output of amplifier 13 directly to the input of inverter 31. The retriggerable one-shot still operates in the same manner except that now the low level input signals to the retriggerable one-shot represent shades of grey lighter than the preselected grey level.

The output of the switch 19 is also connected by way of lead 28 to the terminal C1 of switch S1 so that the uninverted output of the grey select amplifier 13 may be observed on the video monitor. The circuit extends from terminal C1 through switch S1, lead 103, switch contact S2–A5, and mixing potentiometer 169 to the display monitor, When switch 19 is set to the upper position the inverted output of the grey select amplifier 13 as it appears on lead 25 is applied to the monitor over the same circuit.

The invention may be operated in a mode whereby it produces an indication of the total area of features in an unmasked area and meeting both the grey level and width tests. Since the mask area for any particular operation may vary, it is necessary to know the total area falling within the unmasked region. The calibration of area is accomplished by means of a switch 175 and a resistance 177 connected with amplifier 13. When the switch 175 is closed, the amplifier is overdriven by blocking out the grey matching controls and the resulting output signal is applied through inverters 23, 31, 47, and 49 to appear on lead 51 as a continuous positive signal. The video camera continuously produces horizontal and vertical sync pulses which control the masking one-shot multivibrators so that there is a positive signal on lead 55 during each horizontal scan and for an interval of time as determined by the controls of the masking one-shots. Therefore, during each horizontal scan of the unmasked area, the output of NAND gate 53 is at a low level. This output is inverted at 57 and applied through switch S1, contact B5, to one input of NAND gate 97. The continuously running oscillator 99 produces positive pulses to condition the other input of the NAND gate and it produces low level output signals that are inverted by inverter 101 and applied through contact S1–C5, lead 103, and lead 105 to the scaler 6. Therefore, the scaler accumulates a count which represents the area that is unmasked. This count is accumulated only during the first scanning field of the camera following depression of the start button 133.

After the total area of the unmasked region is determined the next step is to determine the area within the unmasked areas that is covered by features meeting both the grey level test and the width test. The switch 175 is opened so that the amplifier 13 may make the grey level test. The start button 133 is again pushed to initiate the one-shot 137 and condition the scaler for one field of counting. The amplifier 13 and retriggerable one-shot 33 function in a normal manner and as a result, a sequence of pulses is produced on lead 51 at the input of NAND gate 53. Each of these pulses represents a feature that meets both the grey level and width tests.

Furthermore, each of these signals on lead 51 has a duration which is dependent upon the width of the feature detected. If the feature detected is in the unmasked region, then NAND gate 53 produces an output signal that is inverted at 57 and applied through switch contacts S1–B5 to condition NAND gate 97. As in the calibration step described above, the oscillator applies pulses to the second input of NAND gate 97 and the resulting output pulses from the NAND gate are applied through inverter 101 and switch contact S1-5C to the scaler. Therefore, on each horizontal scan one or more pulses are fed to the scaler the exact number of pulses being fed being dependent upon the number of feature pulses present on lead 51 and the duration of these pulses. After a complete field of scans, the scaler contains a count which is a percentage of the calibration count obtained during the calibration step. This percentage represents the percentage of the total area of the unmasked region which is covered by features meeting the grey level test and the width test.

From the above description it is seen that the present invention provides a highly versatile specimen analyzer that is more accurate than the analyzers heretofore known. It permits electronic masking without requiring the compensation circuits normally required when such masking is used. The device is capable of counting features of very irregular shape and is also capable of counting features which are very closely spaced.

Although a specific embodiment of the invention has been described with great particularlity, it will be understood that the invention is not limited to the specific embodiment shown. Various modifications falling within the spirit and scope of the invention will be obvious to those skilled in the art. For example, for purposes of explaining the invention it has been assumed that the one-Shot 137 must be set to allow counting by the scaler during only one scanning field of the camera cycle. In actual practice a better statistical count may be obtained by adjusting the one-shot so that each time the one-shot is triggered it enables the scaler to count over a cycle which comprises 10 consecutive fields of scan. The correct count may then be obtained by displacing the decimal point one place to the left in the value displayed by the scaler.

As a further modification, the delay line 73 may be made equivalent to exactly one line scan interval and the adjustable delay 74 replaced in function by another retriggerable one-shot. The new retriggerable one-shot would be connected between inverter 77 and NAND gate 67.

We claim:

1. In a specimen analyzer for analyzing a specimen containing features, the combination comprising:
   discriminator means responsive to an analog signal representing said features for testing a characteristic of said features and producing a binary-type pulse for each feature meeting said test;
   an electronic masking circuit for generating a variable masking signal; and,
   coincidence detection means responsive to said masking signal and said binary-type pulses for producing an intercept signal each time said analog signal changes to represent a feature which meets said test and is located in an unmasked area of said specimen.

2. The combination as claimed in claim 1 wherein said discriminator means includes means for determining if said features are wider than a preselected width.

3. The combination as claimed in claim 1 wherein said discriminator means includes means for determining if said features are darker than a preselected grey level.

4. The combination as claimed in claim 1 and further comprising:
   an oscillator; and,
   gating means responsive to said oscillator and said coincidence detection means;
   whereby said gating means produces at its output a number of pulses related to the area of said features which meet said test and are located in the unmasked area of said specimen.

5. The combination as claimed in claim 1 wherein said first discriminator means includes means for determining if said features are darker than a preselected grey level.

6. A specimen analyzer for analyzing a specimen containing features, said specimen analyzer comprising:
   scanning means for scanning said specimen and producing an analog output signal corresponding to said features;
   grey level select means responsive to said scanning means for producing binary-type signals having a first value during intervals that said analog output signal exceeds a preselected level and a second value during intervals that said analog output signal does not exceed said preselected level;
   means for producing horizontal and vertical sync pulses relates in time to the scanning of said scanning mean;
   an electronic masking circuit responsive to said horizontal and vertical sync pulses for generating a variable masking signal; and,
   further means responsive to said masking signal and the output signals form said grey level select means for producing an intercept signal each time the scan of said scanning means intercepts a feature which exceeds the selected grey level, and is located in an unmasked area within the field of scan of said scanning means.

7. A specimen analyzer as claimed in claim 6 wherein said masking circuit comprises four manually controllable one-shot multivibrator responsive to said sync pulses, and means for logically combining the output signals from said multivibrators to produce said variable masking signal.

8. A specimen analyzer as claimed in claim 6 wherein said scanning means comprises a video camera.

9. A specimen analyzer as claimed in claim 8 wherein said scanning means further comprises microscope means, said video camera being positioned to scan said specimen through said microscope means.

10. A specimen analyzer as claimed in claim 6 wherein said further means includes:
    width select means responsive to said grey level select means for producing an output signal for each feature that is wider than a preselected width; and,
    coincidence detection means responsive to said masking signal and the output signal from said width select means for producing an intercept signal each time the scan of said scanning means intercepts a feature which exceeds the selected grey level, is wider than said preselected width, and is located in an unmasked area within the field of scan of said scanning means.

11. A specimen analyzer as claimed in claim 10 and further comprising feature discriminator means, said feature discriminator means including,
    delay means responsive to said intercept signals for delaying each intercept signal for a predetermined interval of time and producing delayed intercept signals,
    and comparison means responsive to said intercept signals and said delayed intercept signals for producing a count pulse.

12. A specimen analyzer as claimed in claim 11 and further comprising a scaler responsive to said count pulses for accumulating a count representative of the number of features in said specimen that exceed said preselected grey level, are wider than said preselected width, and are located in an unmasked area of said specimen.

13. In a specimen analyzer for analyzing a specimen containing features, the combination comprising:
    first discriminator means responsive to an analog signal representing said features for testing a characteristic of said features and producing a binary-type pulse for each feature meeting said test; and,
    feature discriminator means including:
       a delay means and a one-shot multivibrator means each responsive to said first discriminator means,
       first logical gating means responsive to said delay means and said first discriminator means; and,
       second logical gating means responsive to said first logical gating means and said one-shot multivibrator means for producing one count pulse for each feature represented by said analog signal that meets said test.

14. The combination as claimed in claim 13 wherein said first discriminator means includes means for determining if said features are wider than a preselected width.

15. A specimen analyzer for analyzing features of a specimen according to grey level and width, said specimen analyzer comprising:

scanning means for scanning said specimen in a sequence of line scan intervals and producing an analog output signal corresponding to the grey level of the feature being scanned;

grey level select means responsive to said analog signal for producing binary-type signals having a first value during intervals that said analog signal exceeds a preselected level and a second value during intervals that said analog signal does not exceed said preselected level;

each said first value binary signal having a duration corresponding to the width of the feature which caused it to be produced;

width select means responsive to said level select means for producing an intercept signal in response to each binary signal of one of said levels that is longer than a preselected duration; and, feature discriminator means including, delay means responsive to said width select means for delaying each intercept signal for an interval of time approximating the time of one of said line scan intervals;

first comparison means responsive to said width select means and said delay means for comparing each intercept signal with the preceding intercept signal;

one-shot multivibrator means responsive to said width select means; and, second comparison means responsive to said one-shot multivibrator means and said first comparison means for producing one count pulse for each feature which exceeds said preselected grey level and is wider than said preselected width.

16. A specimen analyzer as claimed in claim 15 and further comprising scaler means for counting said pulses.

17. A specimen analyzer as claimed in claim 15 and further comprising means responsive to said scanning means and said count pulses for displaying one marker pulse adjacent each feature which causes a count pulse to be produced.

18. A specimen analyzer as claimed in claim 15 wherein said delay means includes a delay line connected in series with a variable delay, said variable delay being adjustable to provide, with said delay line, a total delay greater than the time required for one line scan.

19. A specimen analyzer as claimed in claim 18 wherein said one-shot multivibrator means comprises a retriggerable one-shot multivibrator for producing an output pulse in response to each intercept pulse, said output pulse beginning at the same time as said intercept pulse but terminating after said intercept pulse.

20. A specimen analyzer for analyzing features of a specimen according to grey level and width, said specimen analyzer comprising:

grey level select means responsive to an analog signal representing features of said specimen for producing binary-type signals having a first value during intervals that said analog signal exceeds a preselected level and a second value during intervals that said analog signal does not exceed said preselected level;

each said first value binary signal having a duration corresponding to the width of the feature which caused it to be produced; and, width select means responsive to said level select means for producing an intercept signal in response to each binary signal of one of said levels that is longer than a preselected duration;

said width select means comprising a retriggerable one-shot multivibrator responsive to said binary-type signals; and an inverter connected in parallel with said retriggerable one-shot multivibrator.

21. In a specimen analyzer for determining the area of features in a specimen that meet a grey level test and width test, the combination comprising:

grey level test means responsive to an analog signal representing said feature for producing signals of a first level when said analog signal represents a feature which meets said grey level test and signals of a second level when said analog signal represents a feature which does not meet said grey level test, said first level signals each being of a duration proportional to the width of the feature which caused it to be produced, width test means responsive to said grey level test means for producing an output signal for each first level output signal that is greater than a predetermined duration;

an oscillator, gating means responsive to said width test means and said oscillator for producing count pulses;

a scaler responsive to count pulse from said gating means; and, variable electronic masking means for inhibiting each output signal from said width test means which results from a feature within an area of said specimen as determined by said masking means.

22. The combination as claimed in claim 21 wherein said masking means comprises means generating sync pulses, four variable one-shot multivibrators responsive to said sync pulses, and means for logically combining the outputs from said four one-shot multivibrators to produce an inhibiting signal.

23. A specimen analyzer as claimed in claim 21 and further comprising microscope means and a video camera, said video camera scanning said specimen through said microscope means to produce said analog signal representing said features.

PO-1050
(5/69)

UNITED STATES PATENT OFFICE
CERTIFICATE OF CORRECTION

Patent No. 3,578,904          Dated May 18, 1971

Inventor(s) Raymond D. Dewey; Robert S. Mapes; Garth S. Jones

It is certified that error appears in the above-identified patent and that said Letters Patent are hereby corrected as shown below:

Column  1, line 57, after "displaying", insert -- a --.

Column  2, line 39, for "features", read -- feature --.

Column  2, line 72, for "logical 1 5.4" read -- logical one (5.4V)--

Column  2, line 73, for "signals", read -- signal --.

Column  2, line 73, for "level 0" read -- level (0V) --.

Column  3, line 32, for "the cross", read -- across --.

Column  4, line 16, for "+3.5 or 0", read -- +3.5V or 0V --.

Column  4, line 33, after "one-shot" insert -- is --.

Column  6, line  4, for "and 55 is", read -- and 55 are --.

Column  6, line 36, for "discontinuously", read -- continuously --.

Column  8, line 53, for "below", read -- above --.

Column 10, line 59, for "55", read -- 155 --.

Column 11, line 21, for "applied" read -- applies --.

Column 11, line  1, for "gate 155 so that the gate 155", read
                    -- gate 143 so that gate 143 --.

Column 13, line 69, for "claim 1", read -- claim 13 --.

Column 14, line 20, for "multivibrator", read -- multivibrators --.

Column 16, line 37, for "pulse", read -- pulses --.

Signed and sealed this 29th day of February 1972.

(SEAL)
Attest:

EDWARD M. FLETCHER, JR.          ROBERT GOTTSCHALK
Attesting Officer                Commissioner of Patents